US012445873B2

(12) United States Patent
Jiang et al.

(10) Patent No.: US 12,445,873 B2
(45) Date of Patent: Oct. 14, 2025

(54) SSB-BASED MEASUREMENT METHOD AND APPARATUS

(71) Applicant: FUJITSU LIMITED, Kawasaki (JP)

(72) Inventors: Qinyan Jiang, Beijing (CN); Guoyu Zhang, Beijing (CN); Tsuyoshi Shimomura, Kawasaki (JP); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 970 days.

(21) Appl. No.: 17/488,461

(22) Filed: Sep. 29, 2021

(65) Prior Publication Data

US 2022/0022072 A1 Jan. 20, 2022

Related U.S. Application Data

(63) Continuation of application No. PCT/CN2019/085373, filed on Apr. 30, 2019.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
None
See application file for complete search history.

(56) References Cited

U.S. PATENT DOCUMENTS

2015/0124726 A1 5/2015 Ni et al.
2019/0014493 A1 1/2019 Kim et al.
2019/0199496 A1* 6/2019 Qin ........................ H04W 16/28
2019/0239092 A1* 8/2019 Zhou ...................... H04W 16/28
2019/0297519 A1* 9/2019 Han ....................... H04W 72/54
2019/0297537 A1* 9/2019 Tsai .................. H04W 36/0085
2019/0306765 A1* 10/2019 Cirik ................. H04W 36/0058
2019/0320469 A1* 10/2019 Huang .............. H04W 74/0833
2020/0029229 A1 1/2020 Harada et al.
2020/0068457 A1 2/2020 You et al.
2020/0119800 A1* 4/2020 Rune ................... H04W 72/046
(Continued)

FOREIGN PATENT DOCUMENTS

CN 102684835 A 9/2012
CN 108810922 A 11/2018
(Continued)

OTHER PUBLICATIONS

International Search Report and Written Opinion of the International Searching Authority issued by the China National Intellectual Property Administration for corresponding International Patent Application No. PCT/CN2019/085373, mailed on Jan. 9, 2020, with an English translation.
(Continued)

*Primary Examiner* — Nicholas Sloms
(74) *Attorney, Agent, or Firm* — Myers Wolin, LLC

(57) ABSTRACT

An SSB-based measurement method and apparatus, in which a first measurement result of a first cell is obtained according to at least one of QCL relationships between SSBs to which the first cell corresponds, an SSB transmission restriction to which the first cell corresponds and a detection result of SSBs of the first cell, and measurement information of the first cell is generated according to the first measurement result of the first cell and reported.

17 Claims, 7 Drawing Sheets

(56) References Cited

U.S. PATENT DOCUMENTS

| | | | | |
|---|---|---|---|---|
| 2020/0120622 | A1* | 4/2020 | Yoon | H04L 1/0026 |
| 2020/0163074 | A1 | 5/2020 | Tang et al. | |
| 2020/0169340 | A1 | 5/2020 | Hwang et al. | |
| 2020/0267583 | A1* | 8/2020 | Cheng | H04W 48/16 |
| 2020/0267768 | A1* | 8/2020 | Hakola | H04B 7/0408 |
| 2020/0280409 | A1* | 9/2020 | Grant | H04L 5/0044 |
| 2020/0359422 | A1* | 11/2020 | Xie | H04W 74/0833 |
| 2021/0160022 | A1* | 5/2021 | Cha | H04L 5/0048 |
| 2021/0385774 | A1* | 12/2021 | He | H04L 27/26025 |
| 2022/0217665 | A1* | 7/2022 | Liu | H04B 7/022 |
| 2023/0232348 | A1* | 7/2023 | Tang | H04L 5/0094 370/329 |
| 2024/0365258 | A1* | 10/2024 | Shen | H04W 72/23 |

FOREIGN PATENT DOCUMENTS

| | | | |
|---|---|---|---|
| CN | 109302720 | A | 2/2019 |
| EP | 3 451 553 | A2 | 3/2019 |
| EP | 3 471 296 | A1 | 4/2019 |
| EP | 3 609 225 | A1 | 2/2020 |
| EP | 3 629 617 | A1 | 4/2020 |
| KR | 10-2019-006297 | A | 1/2019 |
| WO | 2018/128187 | A1 | 7/2018 |
| WO | 2018/128427 | A1 | 7/2018 |
| WO | 2018/199074 | A1 | 11/2018 |
| WO | 2018/201990 | A1 | 11/2018 |
| WO | 2018/212619 | A1 | 11/2018 |
| WO | 2019/031791 | A1 | 2/2019 |

OTHER PUBLICATIONS

Notice of Reasons for Refusal issued by the Japan Patent Office for corresponding Japanese Patent Application No. 2021-557988, mailed on Apr. 18, 2023, with an English translation.

The supplementary partial European search report issued by the European Patent Office for corresponding European Patent Application No. 19927403.6-1216, mailed on Apr. 12, 2022.

VIVO, "Discussion on beam measurement, beam reporting and beam Indication", Agenda Item: 6.2.2.3, 3GPP TSG-RAN WG1 NR Ad Hoc Meeting #3, R1-1715619, Nagoya, Japan, Sep. 18-21, 2017.

Ericsson, "On beam indication, measurement, and reporting", Agenda Item: 7.2.2.3, 3GPP TSG-RAN WG1 Meeting #90bis, R1-1718433, Prague, Czech Republic, Oct. 9-13, 2017.

Notice of Reasons for Refusal issued by the Japan Patent Office for corresponding Japanese Patent Application No. 2021-557988, mailed on Dec. 6, 2022, with an English translation.

Spreadtrum Communications, "Discussion on initial access and mobility in NR-U", 3GPP TSG-RAN WG1 Meeting #96bis, R1-1904801, Xi'an, China, Apr. 8-12, 2019.

First Notification of Office Action and Search Report issued by the China National Intellectual Property Administration for corresponding Chinese Patent Application No. 201980095121.X, mailed on Jul. 1, 2023, with an English translation.

Notice of Preliminary Rejection issued by the Korean Intellectual Property Office for corresponding Korean Patent Application No. 10-2021-7031490, mailed on Oct. 23, 2023, with an English translation.

The Extended European search report with the European search opinion issued by the European Patent Office for corresponding European Patent Application No. 23153425.6-1216, mailed on Jun. 6, 2023.

LG Electronics, "Initial access and mobility for NR-U", Agenda Item: 7.2.2.2.2, 3GPP TSG-RAN WG1 Meeting #96bis, R1-1904623, Xi'an, China, Apr. 8-12, 2019.

OPPO, "Enhancements to initial access procedure for NR-U", Agenda Item: 7.2.2.2.2, 3GPP TSG-RAN WG1 Meeting #96bis, R1-1904895, Xi'an, China, Apr. 8-12, 2019.

The First Examination Report issued by the Indian Patent Office for corresponding Indian Patent Application No. 202137043552, dated Mar. 23, 2022, with an English translation.

Hearing Notice issued by the Patent office of India for corresponding Indian patent application No. 202137043552, mailed on Jan. 17, 2024, with an English translation.

* cited by examiner

SSB-BASED MEASUREMENT METHOD AND APPARATUS

CROSS-REFERENCE TO RELATED APPLICATION

This application is a continuation application of International Application PCT/CN2019/085373 filed on Apr. 30, 2019 and designated the U.S., the entire contents of which are incorporated herein by reference.

TECHNICAL FIELD

This disclosure relates to the field of communication technologies, and in particular to an SSB-based measurement method and apparatus.

BACKGROUND

3GPP (3rd Generation Partnership Project) is studying related topics of next-generation wireless communication systems. In a next-generation wireless communication system, such as in a New Radio (NR) system, a synchronization signal block (SSB) in a cycle is transmitted in a half sub-frame, a length of the half sub-frame being 5 ms. In the NR system, for different frequency bands and subcarrier spacings, a time domain position of the SSB in the half sub-frame is predefined, and SSBs at different time domain positions are indicated by SSB indices, and a demodulation reference signal (DMRS) and a physical broadcast channel (PBCH) in an SSB may indicate an SSB index to which the SSB corresponds. For example, for the 3~6 GHz frequency band, a half sub-frame includes predefined time domain positions of 8 SSBs, and these 8 SSBs correspond to SSB indices with value of 0~7 in a one-to-one correspondence.

In the NR system, a network may configure that a user equipment (UE) in a connected state performs measurement according to measurement configuration and reports a measurement result. The measurement configuration is transmitted to the UE via RRC signaling, such as an RRCReconfiguration message. The measurement configuration includes, for example, at least one of the following parameters: measurement objects (MOs), reporting configurations, measurement identities, quantization configurations and measurement gaps. The measurement objects include a list of measurement objects which should be measured by the UE, and a measurement object corresponds to a time-frequency domain position and subcarrier spacing (SCS) of a specific reference signal. The reporting configurations include measurement information which should be reported by the UE. The measurement identifiers characterize correspondences between the measurement objects and the reporting configurations, one measurement identifier characterizing a correspondence between one measurement object and one reporting configuration.

In particular, the network may configure the UE to perform measurement based on SSBs and/or CSI-RS (CSI reference signals). Taking SSB-based measurement information as an example, the measurement objects indicate time-frequency domain positions and SCSs of SSBs to be measured.

When the UE performs measurement according to the MOs, the UE may measure multiple cells to which the MOs corresponds, and the multiple cells transmit SSBs at the time-frequency domain positions indicated by the MOs and using the SCSs indicated by the MOs. The UE may distinguish SSBs corresponding to different cells via physical cell IDs (PCIs) to which the SSBs correspond, that is, it is considered that SSBs corresponding to identical PCIs belong to the same cell. The multiple cells may include different types of cells, such as a serving cell, a cell listed in the MOs, and a cell not listed in the MOs but detected by the UE.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In NR Rel-15, SSBs in an SSB transmission window correspond to beams one to one, or in other words, SSB time domain positions (characterized by SSB indices) in the SSB transmission window correspond to the beams one to one. Moreover, as only for licensed frequency bands, in general, time domain positions of SSBs to which SSB sets actually transmitted in different SSB transmission windows correspond are identical. Therefore, the UE may obtain measurement results of the beams to which the time domain positions of the SSBs correspond according to the one-to-one correspondence between the time domain positions of the SSBs and the beams, or obtain measurement results of corresponding cells based on measurement of one or more beams, thereby reporting the measurement results to the network.

However, it was found by the inventors that in NR-U, considering that transmission of SSBs is limited to LBT (Listen Before Talk), in order to ensure cell coverage, candidate SSB time domain positions for transmitting SSBs in an SSB transmission window are increased. Increase of the number of the candidate SSB time domain positions may cause increase of complexity and power consumption of the UE in performing measurement.

On the other hand, as the network device may only transmit SSBs when it detects that a channel is idle, and in an SSB transmission window, the network device may only transmit a part of the SSBs, or even not transmit the SSBs, and SSB time domain positions to which SSB sets transmitted in different SSB transmission windows correspond may possibly be different. Hence, when an existing method is adopted for measurement, it is hard to ensure accuracy of measurement results, and reliability of mobility management will be affected.

In order to solve at least one of the above problems, embodiments of this disclosure provide an SSB-based measurement method and apparatus.

According to a first aspect of the embodiments of this disclosure, there is provided an SSB-based measurement apparatus, applicable to a user equipment side, the apparatus including: a first measuring unit configured to obtain a first measurement result of a first cell according to at least one of QCL relationships between SSBs to which the first cell corresponds, an SSB transmission restriction to which the first cell corresponds and a detection result of SSBs of the first cell; a first generating unit configured to generate measurement information of the first cell according to the first measurement result of the first cell; and a first transmitting unit configured to transmit the measurement information to a network.

According to a second aspect of the embodiments of this disclosure, there is provided an apparatus for transmitting indication information used for measurement, applicable to a network device side, the apparatus including: a second transmitting unit configured to transmit indication information for SSB-based measurement, the indication information indicating at least one of QCL relationships between SSBs and an SSB transmission restriction.

According to a third aspect of the embodiments of this disclosure, there is provided a user equipment, including the apparatus as described in the first aspect of the embodiments of this disclosure.

According to a fourth aspect of the embodiments of this disclosure, there is provided a network device, including the apparatus as described in the second aspect of the embodiments of this disclosure.

According to a fifth aspect of the embodiments of this disclosure, there is provided a communication system, including the user equipment as described in the third aspect of the embodiments of this disclosure and/or the network device as described in the fourth aspect of the embodiments of this disclosure.

According to a sixth aspect of the embodiments of this disclosure, there is provided an SSB-based measurement method, applicable to a user equipment side, the method including: obtaining a first measurement result of a first cell according to at least one of QCL relationships between SSBs to which the first cell corresponds, an SSB transmission restriction to which the first cell corresponds and a detection result of SSBs of the first cell; generating measurement information of the first cell according to the first measurement result of the first cell; and transmitting the measurement information to a network.

According to a seventh aspect of the embodiments of this disclosure, there is provided a method for transmitting indication information used for measurement, applicable to a network device side, the method including: transmitting indication information for SSB-based measurement, the indication information indicating at least one of QCL relationships between SSBs and an SSB transmission restriction.

According to an eighth aspect of the embodiments of this disclosure, there is provided a computer readable program, which, when executed in an SSB-based measurement apparatus or a user equipment, will cause the SSB-based measurement apparatus or the user equipment to carry out the SSB-based measurement method as described in Embodiment 6.

According to a ninth aspect of the embodiments of this disclosure, there is provided a computer storage medium, including a computer readable program code, which will cause an SSB-based measurement apparatus or a user equipment to carry out the SSB-based measurement method as described in Embodiment 6.

According to a tenth aspect of the embodiments of this disclosure, there is provided a computer readable program, which, when executed in an apparatus for transmitting indication information used for measurement or a network device, will cause the apparatus for transmitting indication information used for measurement or the network device to carry out the method for transmitting indication information used for measurement as described in Embodiment 7.

According to an eleventh aspect of the embodiments of this disclosure, there is provided a computer storage medium, including a computer readable program code, which will cause an apparatus for transmitting indication information used for measurement or a network device to carry out the method for transmitting indication information used for measurement as described in Embodiment 7.

An advantage of the embodiments of this disclosure exists in that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
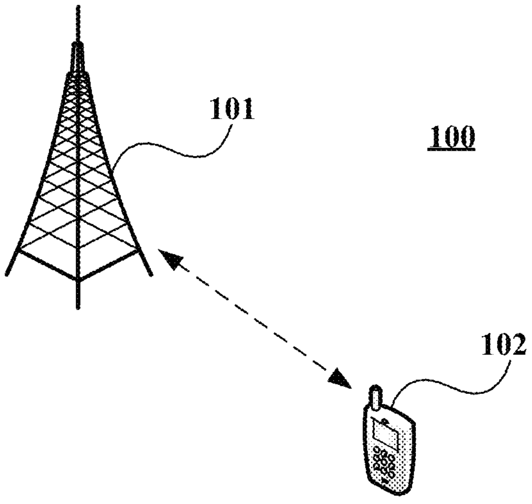
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms “first”, and “second”, etc., are used to differentiate different elements with respect to names, and do not indicate spatial arrangement or temporal orders of these elements, and these elements should not be limited by these terms. Terms “and/or” include any one and all combinations of one or more relevantly listed terms. Terms “contain”, “include” and “have” refer to existence of stated features, elements, components, or assemblies, but do not exclude existence or addition of one or more other features, elements, components, or assemblies.

In the embodiments of this disclosure, single forms “a”, and “the”, etc., include plural forms, and should be understood as “a kind of” or “a type of” in a broad sense, but should not defined as a meaning of “one”; and the term “the” should be understood as including both a single form and a plural form, except specified otherwise. Furthermore, the term “according to” should be understood as “at least partially according to”, the term “based on” should be understood as “at least partially based on”, except specified otherwise.

In the embodiments of this disclosure, the term “communication network” or “wireless communication network” may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term “network device”, for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term “base station” may include some or all of its functions, and each base station may provide communication coverage for a specific geographical area. And a term “cell” may refer to a base station and/or its coverage area, which may be expressed as a serving cell, and may be a macro cell or a pico cell, depending on a context of the term.

In the embodiments of this disclosure, the term “user equipment (UE)” refers to, for example, equipment accessing to a communication network and receiving network services via a network device, which may also be referred to as “terminal equipment (TE)”. The terminal equipment may be fixed or mobile, and may also be referred to as a mobile station (MS), a terminal, a subscriber station (SS), an access terminal (AT), or a station, etc.

In the embodiments of this disclosure, the terminal equipment may include but not limited to the following devices: a cellular phone, a personal digital assistant (PDA), a wireless modem, a wireless communication device, a hand-held device, a machine-type communication device, a laptop, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101 and a user equipment 102. For the sake of simplicity, description is given in FIG. 1 by taking one user equipment as an example. And the network device 101 may be, for example, a network device gNB in NR.

In the embodiment of this disclosure, existing traffics or traffics that may be implemented in the future may be performed between the network device 101 and the user equipment 102. For example, such traffics may include but not limited to enhanced mobile broadband (eMBB), massive machine type communication (MTC), and ultra-reliable and low-latency communication (URLLC), etc.

For example, the network device 101 transmits or does not transmit SSBs to the user equipment 102 in different transmission windows, and the user equipment 102 performs SSB-based measurement and generates and reports measurement information.

Various implementations of the embodiments of this disclosure will be described below with reference to the accompanying drawings. These implementations are exemplary only, and are not intended to limit this disclosure.

Embodiment 1

The embodiment of this disclosure provides an SSB-based measurement method, applicable to a user equipment side.

Figure 2:
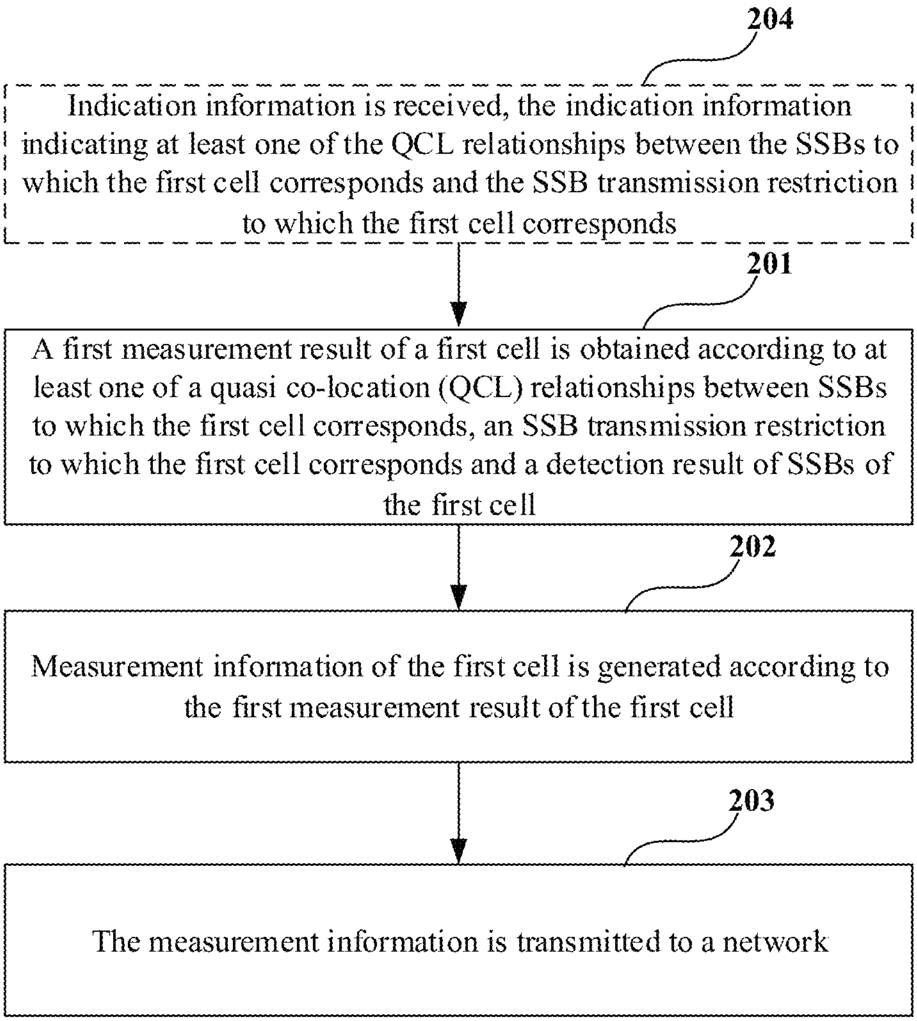
FIG. 2 is a schematic diagram of the SSB-based measurement method of Embodiment 1 of this disclosure.

FIG. 2 is a schematic diagram of the SSB-based measurement method of Embodiment 1 of this disclosure. As shown in FIG. 2, the method including:

Step 201: a first measurement result of a first cell is obtained according to at least one of quasi co-location (QCL) relationships between SSBs to which the first cell corresponds, an SSB transmission restriction to which the first cell corresponds and a detection result of SSBs of the first cell;

Step 202: measurement information of the first cell is generated according to the first measurement result of the first cell; and Step 203: the measurement information is transmitted to a network.

Hence, by obtaining the first measurement result of the first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

In this embodiment, the first cell may be a serving cell or a non-serving cell of the UE. For example, the non-serving cell may be a cell listed in the MOs or a cell not listed in the MOs but detected by the UE.

In this embodiment, the QCL relationships between SSBs may also be referred to as association relationships between SSBs and beams. When two SSBs are QCLed, it may also be said that beams with which the two SSBs are associated are identical. For the convenience of further explanation, the latter manner shall be used below. In this embodiment, a window includes multiple candidate SSB time domain positions (such as being referred to as candidate SSB (time) positions), and the UE may attempt to receive SSBs at the candidate SSB time domain positions for measurement. For UE measurement, this window may be referred to as a transmission window or a measurement window, which is, for example, represented as a DRS transmission window, or an SMTC window, or a DMTC window, etc. Considering a multi-beam scenario, a cell may have only one or multiple beams. As the transmission of SSBs is limited to LBT, a beam may need a transmission occasion in a window to ensure coverage. That is, there may exist that SSBs at different candidate SSB time domain positions are associated with the same beam in a window.

In an embodiment, the association relationships between the SSBs and the beams in a window may be determined according to correspondence relationships between the candidate SSB time domain positions and the beams. And association relationships between SSBs and beams in different windows are identical.

For example, Table 1 shows the correspondence relationships between candidate SSB time domain positions and beams in a window.

TABLE 1

| Candidate SSB time domain positions | Beams |
|---|---|
| 0 | 0 |
| 1 | 1 |
| 2 | 2 |
| 3 | 3 |
| 4 | 0 |
| 5 | 1 |
| 6 | 2 |
| 7 | 3 |

As shown in Table 1, a window includes 8 candidate SSB time domain positions, and their candidate SSB time domain position indices (such as candidate SSB (time) position indices) are 0~7 respectively, and 4 beams are used by them, with beam indices (such as beam indices, SSB indices) being 0~3 respectively; for example, SSBs transmitted at the candidate SSB time domain position indices 0 and 4 correspond to the same beam 0, SSBs transmitted at the candidate SSB time domain position indices 1 and 5 correspond to the same beam 1, SSBs transmitted at the candidate SSB time domain position indices 2 and 6 correspond to the same beam 2, and SSBs transmitted at the candidate SSB time domain position indices 3 and 7 correspond to the same beam 3. Table 1 is only an example, and the number of the SSBs in a window may also be, for example, 10 (SSB SCS=15 kHz) or 20 (SSB SCS=30 kHz), and the number of the beams may be, for example, an integer from 1~8.

In another embodiment, association relationships between SSBs and beams in one window or different windows may be determined according to DMRS sequences in the SSBs. In this case, when a candidate SSB time domain position corresponds to a DMRS sequence, the association relationships may also be determined according to the candidate SSB time domain positions; otherwise, it may only be determined according to the sequences.

In this embodiment, as the numbers of the candidate SSB time domain positions and the beams in a window of different cells may be different, association relationships between SSBs and beams corresponding to different cells may also be different.

In this embodiment, the SSB transmission restriction includes, for example, at least one of the following: a specified number of SSBs transmitted in a window, a maximum number of SSBs transmitted in a window, a range of transmission of SSBs in a window, a specified number of SSBs corresponding to a beam and transmitted in a window, and a maximum number of SSBs corresponding to a beam and transmitted in a window.

In this embodiment, as the candidate SSB time domain positions, the numbers of beams and the numbers of SSBs needing to be transmitted in a window of different cells may be different, SSB transmission restrictions to which different cells correspond may also be different.

In this embodiment, the detection results of the SSBs of the first cell refer to results of detection performed by the UE on the SSBs transmitted by the first cell, such as received power of the SSBs to which the candidate SSB time domain positions correspond, the number of SSBs detected by the UE and candidate SSB time domain positions where the detected SSBs are located, in one window or multiple windows.

In step 201, the first measurement result of the first cell is obtained according to at least one of the quasi co-location (QCL) relationships between the SSBs to which the first cell corresponds, the SSB transmission restriction to which the first cell corresponds and the detection results of the SSBs of the first cell.

Figure 3:
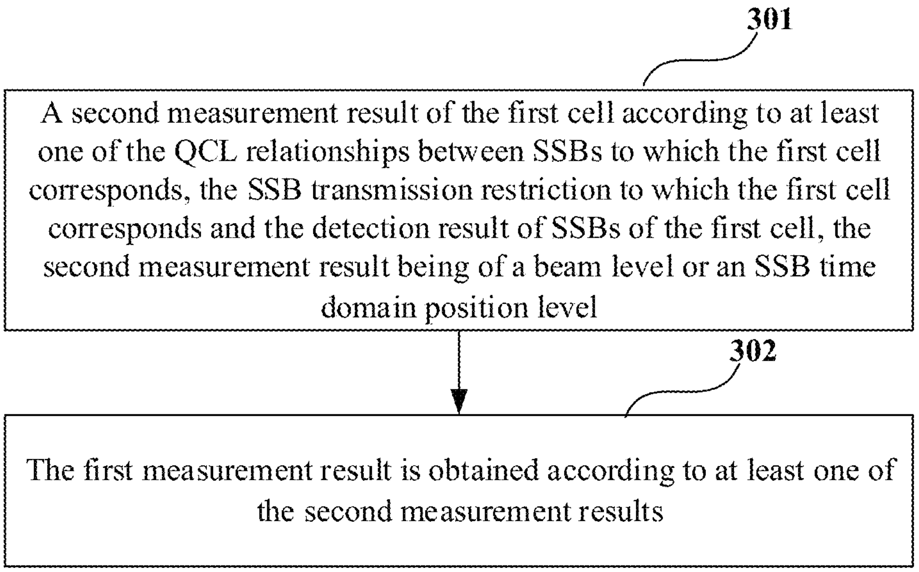
FIG. 3 is a schematic diagram of a method for executing step 201 of Embodiment 1 of this disclosure.

FIG. 3 is a schematic diagram of a method for executing step 201 of Embodiment 1 of this disclosure. As shown in FIG. 3, step 201 includes:

Step 301: a second measurement result of the first cell according to at least one of the QCL relationships between SSBs to which the first cell corresponds, the SSB transmission restriction to which the first cell corresponds and the detection result of SSBs of the first cell, the second measurement result being of a beam level or an SSB time domain position level; and Step 302: the first measurement result is obtained according to at least one of the second measurement results.

In this embodiment, the first measurement result may be a measurement result of L3 (layer 3), that is, a measurement value of L3 filtering.

In this embodiment, the second measurement result may be a measurement result of the L1 (layer 1), that is, a measurement value of L1 filtering.

The first measurement result is RSRP, RSRQ or an SINR, and correspondingly, the second measurement result is SS-RSRP, SS-RSRQ or an SS-SINR. That is, when the first measurement result is RSRP, the second measurement result should be obtained according to the SS-RSRP.

In this embodiment, how the UE obtains the second measurement result is described by taking that the second measurement result is SS-RSRP as an example.

In step 301, the second measurement result of the first cell may be obtained according to at least one of the QCL relationships between the SSBs to which the first cell corresponds, the SSB transmission restriction to which the first cell corresponds and the detection result of the SSBs of the first cell. The second measurement result is of a beam level (or is beam-specific) or time domain position level (or is position-specific). That is, one second measurement result corresponds to one beam or one SSB time domain position (or a candidate SSB time domain position).

For the case where the second measurement result is of the beam level, Table 2 shows correspondence relationships between candidate SSB time domain positions, beams and SS-RSRPs in a window.

TABLE 2

| SSB time domain positions | Beams | SS-RSRPs |
|---|---|---|
| 0 | 0 | 0 |
| 1 | 1 | 1 |
| 2 | 2 | 2 |
| 3 | 3 | 3 |
| 4 | 0 | 0 |
| 5 | 1 | 1 |
| 6 | 2 | 2 |
| 7 | 3 | 3 |

As shown in Table 2, the SS-RSRPs as the second measurement result correspond to the beams, that is, one SS-RSRP corresponds to one beam, and different beams correspond to different SS-RSRP. Table 2 is an example only, and the number of SSBs in a window may also be, for example, 10 (SSB SCS=15 kHz) or 20 (SSB SCS=30 kHz), and the number of beams may be, for example, an integer from 1~8.

For the case where the second measurement results correspond to the time domain positions, Table 3 shows correspondence relationships between the SSB time domain positions and the SS-RSRPs in a window.

TABLE 3

| SSB time domain positions | SS-RSRPs |
|---|---|
| 0 | 0 |
| 1 | 1 |
| 2 | 2 |
| 3 | 3 |
| 4 | 4 |
| 5 | 5 |
| 6 | 6 |
| 7 | 7 |

As shown in Table 3, the SS-RSRPs as the second measurement result correspond to the time domain positions, that is, one time domain position corresponds to SS-RSRP, and different time domain positions correspond to different SS-RSRP. Table 3 is an example only, and the number of SSBs in a window may also be, for example, 10 (SSB SCS=15 kHz) or 20 (SSB SCS=30 kHz), and the number of beams may be, for example, an integer from 1~8.

Figure 4:
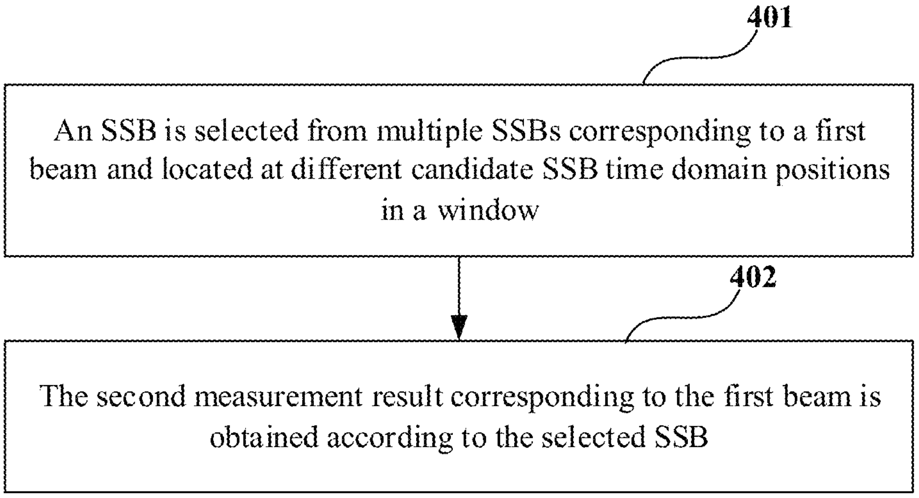
FIG. 4 is a schematic diagram of a method for executing step 301 of Embodiment 1 of this disclosure.

How to obtain the second measurement result in step 301 shall be illustrated below. Case 1) The case where the second measurement result is of a beam level shall be described. FIG. 4 is a schematic diagram of a method for executing step 301 of Embodiment 1 of this disclosure. As shown in FIG. 4, step 301 includes:

Step 401: an SSB is selected from multiple SSBs corresponding to a first beam and located at different candidate SSB time domain positions in a window; and Step 402: the second measurement result corresponding to the first beam is obtained according to the selected SSB.

In step 401, SSBs are selected respectively according to windows, and the number and/or time domain positions of the SSBs selected in different windows may be identical, or may be different.

For a case where there exists a successfully transmitted SSB in a window, when there is at least one SSB corresponding to a first beam, at least one SSB is selected from the SSBs. In addition, there may also be a case where there exists no SSB that is successfully transmitted in the window, and at this moment, no SSB is selected, that is, 0 SSB is selected, or there may be a where there exist SSBs that are successfully transmitted but there exists no SSB corresponding to the first beam in a window, and at this moment, the number of selected SSB corresponding to the first beam is also 0.

Example 1.1

Obtaining the second measurement result of the first cell according to the QCL relationships between the SSBs to which the first cell corresponds. For example, according to the QCL relationships between the SSBs to which the first cell corresponds, whether an SSB at a time domain position is used to obtain the second measurement results is determined, that is, according to the QCL relationships between the SSBs to which the first cell corresponds, a part of SSBs in the SSBs in a window are selected to obtain the second measurement results.

For example, when time domain position indices of multiple SSBs corresponding to a first beam are 0 and 4 respectively, an SSB with a time domain position index of 4 may be selected, and SS-RSRP corresponding to the first beam is obtained according to the SSB.

Example 1.2

Obtaining the second measurement result of the first cell according to the SSB transmission restriction to which the first cell corresponds. For example, according to the SSB transmission restriction to which the first cell corresponds, whether an SSB at a time domain position is used to obtain the second measurement result is determined, that is, according to the SSB transmission restriction to which the first cell corresponds, a part of SSBs in the SSBs in a window are selected to obtain the second measurement result.

As described above, for example, the SSB transmission restriction to which the first cell corresponds may include at least one of the following: a specified number of SSBs transmitted in a window, a maximum number of SSBs transmitted in a window, and a range of transmission of SSBs in a window.

For example, when the specified number of SSBs or the maximum number of SSBs transmitted in a window is set to be X and the UE receives an SSB at a position x, the SS-RSRP is not obtained based on SSBs at other positions than positions x−X+1~x+X−1 in the window.

For example, the range of transmission of SSBs in a window is set to be N, that is, in a case where the SSBs are transmitted at a position n in a window initially, the SSBs cannot be transmitted at positions after n+N in the window. When the UE receives an SSB at a position x, the SS-RSRP is not obtained based on SSBs at other positions than x−N+1~x+N−1 in the window.

Example 1.3

Obtaining the second measurement result of the first cell according to the QCL relationships between the SSBs to which the first cell corresponds and the SSB transmission restriction to which the first cell corresponds. For example, whether the second measurement result is obtained based on an SSB at a time domain position is determined according to the QCL relationships between the SSBs and the SSB transmission restriction, that is, according to the QCL relationships between the SSBs and the SSB transmission restriction, a part of SSBs in SSBs in a window corresponding to the same beam are selected to obtain a corresponding second measurement result.

As described above, the SSB transmission restriction to which the first cell corresponds may further include at least one of the following: a specified number of SSBs corresponding to a beam and transmitted in a window, and a maximum number of SSBs corresponding to a beam and transmitted in a window.

For example, the specified number of SSBs corresponding to a beam and transmitted in a window or the maximum number of SSBs corresponding to a beam and transmitted in a window is set to be Y. For example, when the UE receives Y SSBs corresponding to the beam in a window, corresponding SS-RSRP is not obtained based on SSBs in other positions in the window corresponding to the beam.

Example 1.4

Furthermore, the second measurement result of the first cell may be obtained based on examples 1.1~1.3 combined with the detection results of the SSBs of the first cell.

For example, whether an SSB at a time domain position is used to obtain the second measurement results is determined according to the SSB transmission restriction of the first cell and the detection result of the SSBs of the first cell, that is, according to the SSB transmission restriction of the first cell and the detection result of the SSBs of the first cell, a part of SSBs in the SSBs in a window are selected to obtain the second measurement result.

Case 2) The case where the second measurement result correspond to a time domain position shall be described.

Figure 5:
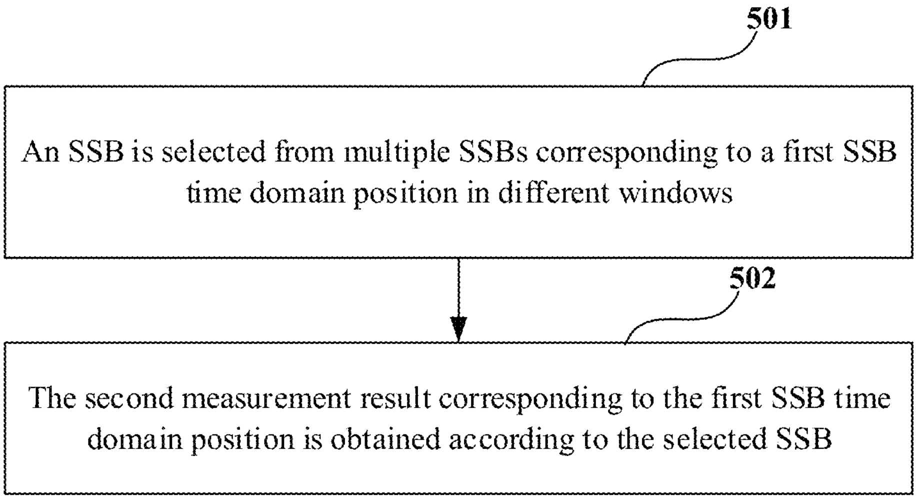
FIG. 5 is another schematic diagram of the method for executing step 301 of Embodiment 1 of this disclosure.

FIG. 5 is another schematic diagram of the method for executing step 301 of Embodiment 1 of this disclosure. As shown in FIG. 5, step 301 includes:

Step 501: an SSB is selected from multiple SSBs corresponding to a first SSB time domain position in different windows; and Step 502: the second measurement result corresponding to the first SSB time domain position is obtained according to the selected SSB.

In this embodiment, for the case where the SSBs corresponding to the first SSB time domain position are successfully transmitted in at least one window, at least one SSB is selected from the SSBs corresponding to the first SSB time domain position successfully transmitted in the at least one window, and for a case where SSBs corresponding to the first SSB time domain position are not successfully transmitted in a window, the number of selected SSBs corresponding to the first SSB time domain position is 0.

Example 2.1

Obtaining the second measurement result of the first cell according to the SSB transmission restriction of the first cell.

A specific method of Example 2.1 is similar to that of Example 1.2, with a difference being that the second measurement result in Example 2.1 is of an SSB time domain position level, and similar contents will not be repeated herein any further.

Example 2.2

Obtaining the second measurement results of the first cell according to the QCL relationships between the SSBs to which the first cell corresponds and the SSB transmission restriction to which the first cell corresponds.

A specific method of Example 2.2 is similar to that of Example 1.3, with a difference being that the second measurement result in Example 2.2 is of an SSB time domain position level, and similar contents will not be repeated herein any further.

Example 2.3

Furthermore, the second measurement results of the first cell may be obtained based on examples 2.1~1.2 combined with the detection result of the SSBs of the first cell.

A specific method of Example 2.3 is similar to that of Example 1.4, with a difference being that the second measurement result in Example 2.3 is of an SSB time domain position level, and similar contents will not be repeated herein any further.

The method for executing step 301 is illustrated above.

In step 302, the first measurement result is obtained according to at least one of the second measurement results.

In this embodiment, the first measurement result is obtained according to at least one of the second measurement results. The first measurement result may be cell-level (cell quantity/cell measurement quantity) or beam-level (beam quantity/beam measurement quantity) or time domain position-level (position quantity/position measurement quantity), and the second measurement result is beam-level or time domain position-level.

For example, the UE may obtain the first measurement result after being L3 filtered according to the following formula (1):

$$F_n=(1-a)*F_{n-1}+a*M_n \quad (1);$$

where, $M_n$ is a value corresponding to at least one latest second measurement result, $F_{n-1}$ is the first measurement result before being updated, $F_n$ is the first measurement result after being updated, $a=½^{(k/4)}$, and k is a filter coefficient filterCoefficient.

In this embodiment, the first measurement result used to generate the measurement information is obtained based on multiple pieces of $M_n$, and the multiple pieces of $M_n$ are obtained based on the second measurement results obtained in multiple different time periods. Multiple windows are generally included in a time period, that is, a second measurement result may be obtained by measuring SSBs in multiple windows. Therefore, a first measurement result may be obtained according to the SSBs of multiple windows.

Obtaining the first measurement result from at least one second measurement result shall be illustrated below.

Example 1: when the first measurement result is cell-level and the second measurement result is beam-level, for example, $M_n$=one second measurement result in multiple second measurement results, or $M_n$=an average value of multiple second measurement results.

Example 2: when the first measurement result is cell-level and the second measurement result is position-level, for example, $M_n$=one second measurement result in multiple second measurement results, or $M_n$=an average value of multiple second measurement results. For another example, for a beam of the first cell, the UE obtains a (beam-level) third measurement result corresponding to the beam according to the QCL relationships between the SSBs to which the first cell corresponds by selecting one of multiple second measurement results corresponding to the beam or combining the multiple second measurement results, and then obtains $M_n$ according to multiple third measurement results corresponding to different beams. In particular, $M_n$=a third measurement result in multiple third measurement results, or $M_n$=an average value of multiple third measurement results.

Example 3: when the first measurement result is beam-level and the second measurement result is beam-level, $M_n$=a second measurement result, a beam to which the second measurement result corresponds being identical to the beam to which the first measurement result corresponds.

Example 4: when the first measurement result is beam-level and the second measurement result is position-level, for example, for a beam of the first cell, the UE obtains a (beam-level) third measurement result corresponding to the beam according to the QCL relationships between the SSBs to which the first cell corresponds by selecting one of multiple second measurement results corresponding to the beam or combining the multiple second measurement results, that is, it is identical to the processing for one beam in Example 2, and $M_n$=the third measurement result, thereby obtaining the first measurement result corresponding to the beam.

Example 5: when the first measurement result is position-level, and the second measurement result is position-level, $M_n$=the second measurement result, and a position to which the second measurement result corresponds is identical to the position to which the first measurement result corresponds.

For example, the second measurement result may be SSB time domain position-level, the second measurement result may include multiple second measurement results corresponding to different SSB time domain positions, one of multiple second measurement results is selected according to the QCL relationships between the SSBs to which the first cell corresponds or the multiple second measurement results are combined, and the first measurement result is obtained according to the selected second measurement result or a result of combination.

In this embodiment, different SSB time domain positions to which the multiple second measurement results correspond may correspond to the same beam, that is, the multiple second measurement results may correspond to the same beam.

For example, since the L1 filtering measurement value SS-RSRP as the second measurement result corresponds to the time domain position, and the SSBs at multiple time domain positions in a window may correspond to the same beam, the UE may obtain SS-RSRP' per beam (beam-level) by selecting or combining SS-RSRP per position (corresponding to a time domain position) corresponding to the same beam, and then according to the SS-RSRP' per beam, obtains the cell-level and/or beam-level L1 filtering measurement result, i.e. the first measurement result.

The method for executing step 201 is illustrated above.

Figure 6:
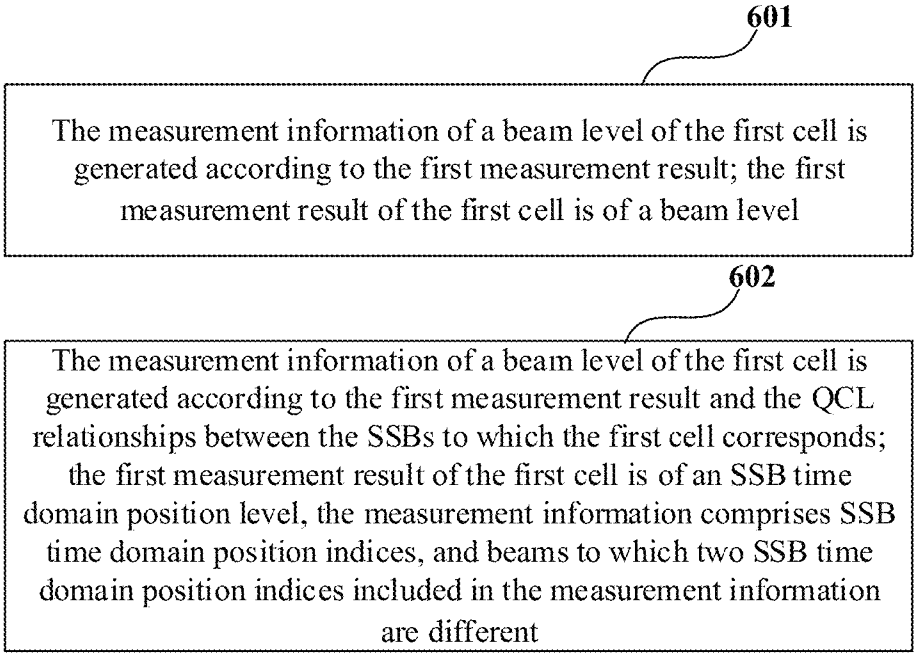
FIG. 6 is a schematic diagram of a method for executing step 202 of Embodiment 1 of this disclosure.

In step 202, the measurement information of the first cell is generated according to the first measurement results of the first cell. FIG. 6 is another schematic diagram of the method for executing step 202 of Embodiment 1 of this disclosure. As shown in FIG. 6, step 202 includes:

Step 601: the measurement information of a beam level of the first cell is generated according to the first measurement result; the first measurement result of the first cell is of a beam level; or Step 602: the measurement information of a beam level of the first cell is generated according to the first measurement result and the QCL relationships between the SSBs to which the first cell corresponds; the first measurement result of the first cell is of an SSB time domain position level, the measurement information includes SSB time domain position indices, and beams to which two SSB time domain position indices included in the measurement information are different.

In step 601, for example, the UE may notify the network of the measurement information of a beam level of a cell by reporting the first measurement result of a beam level and beam indices.

In step 602, for example, the UE notifies the network of the measurement information of the beam level of a cell by reporting the first measurement result of the SSB time domain position level and the SSB time domain position indices, and before reporting the measurement information, the UE generates the measurement information according to the QCL relationships between the SSBs, and the two SSB time domain position indices in the measurement information correspond to different beams.

In addition, for multiple first measurement results corresponding to multiple SSB time-domain positions of a beam, one of the first measurement results may be selected or multiple first measurement results may be combined, and according to the selected first measurement result or a result of combination, the measurement information of the first cell corresponding to a beam is generated.

In step 203, the UE transmits the measurement information to the network.

For example, the measurement information is included in MeasurementReport, and an MeasurementReport may include measurement information of multiple cells corresponding to the same MO.

In this embodiment, at least one of the QCL relationships between the SSBs to which the first cell corresponds and the SSB transmission restriction to which the first cell corresponds is predefined or indicated by the network. Indicating by the network shall be illustrated below.

As shown in FIG. 2, the method may further include:

Step 204: indication information is received, the indication information indicating at least one of the QCL relationships between the SSBs to which the first cell corresponds and the SSB transmission restriction to which the first cell corresponds.

In this embodiment, the indication information may explicitly or implicitly indicate at least one of the QCL relationships between the SSBs to which the first cell corresponds and the SSB transmission restriction to which the first cell corresponds.

For example, the indication information includes first indication information indicating the QCL relationships between the SSBs to which the first cell corresponds and/or second indication information indicating the SSB transmission restriction of the first cell, The first indication information includes at least one of the number of beams in a window and an SSB group in a window;

and the second indication information includes least one of a specified number of SSBs transmitted in a window, a maximum number of SSBs transmitted in a window, a time domain range of transmission of SSBs, and a specified number of SSBs and a maximum number of SSBs corresponding to a beam and transmitted in a window.

In this embodiment, the number of beams in a window may also be referred to as the number of non-QCLed SSBs or the number of DMRS sequences.

For example, the QCL relationships between the SSBs may be determined according to formula (2) or (3) as below:

$$\text{Beam index} = \text{mod}(t, Q), \quad (2)$$

$$\text{Beam index} = \text{mod}\left(\left\lfloor \frac{t}{Q1} \right\rfloor, Q\right); \quad (3)$$

where, t is an index of a candidate SSB time domain position in a window, and Q1 is the number of consecutive candidate SSB time domain positions corresponding to the same beam, which is predefined or indicated by the network, for example, Q1=2.

In this embodiment, the indication information may be transmitted by the first cell or by a second cell.

In this embodiment, the first cell may be a serving cell or a non-serving cell of the UE, such as a cell listed in the MOs or a cell not listed in the MOs but detected by the UE, and the second cell may be a serving cell of the UE.

For example, the indication information is transmitted via at least one of a physical broadcast channel (PBCH), MAC signaling, and system information.

In this case, the indication information may further be used by the UE in transceiving other signals and/or channels in the first cell.

In this embodiment, in a case where the indication information is transmitted by the first cell, the indication information is used only for measurement of the first cell, or the indication information is further used for SSB-based measurement of the second cell, and frequency domain positions and SCSs of SSBs of the second cell and SSBs of the first cell are identical.

For another example, the indication information is transmitted via RRC signaling. For example, the RRC signaling is RRC-specific signaling, such as being transmitted via RRCReconfiguration.

In this case, the indication information may be per MO (i.e. MO-specific) or per cell (i.e. cell-specific). In addition, it may be used in measurement configurations for intra-frequency measurement and inter-frequency measurement.

For example, for the case where the indication information is MO-specific, that is, one piece of indication information corresponds to one MO, or in other words, an indication information is included in an MO and cell identity associated with the indication information is not specified, the indication information is applicable to the UE in measuring a cell to which the MO corresponds, the cell to which the MO corresponds referring to a cell transmitting SSBs at a time-frequency domain position and an SCS indicated by the MO. In this way, when the first cell is one of the cells to which the MO corresponds, after receiving the indication information, the UE may determine the QCL relationships between the SSBs to which the first cell corresponds according to the indication information.

For the case where the indication information is cell-specific, that is, one piece of indication information corresponds to one cell, for example, one MO includes cell identities and associated indication information of multiple cells (listed cells), when the first cell is one of the multiple listed cells, the UE obtains the QCL relationships between the SSBs to which the first cell corresponds according to the indication information to which a corresponding cell identifier corresponds.

In comparison with the cell-specific indication mode, the MO-specific indication mode may lower signaling overhead. And in comparison with the MO-specific indication mode, when QCL relationships between SSBs of different cells corresponding to the same MO are different, the cell-specific indication mode may help the UE improve accuracy of the measurement.

In addition, an MO may include one piece of MO-specific indication information and one or more pieces of cell-specific indication information. When the first cell is a cell to which the MO corresponds but is not a listed cell, when there is no cell-specific indication information, the indication is performed according to the MO-specific indication information.

In this embodiment, the QCL relationships between the SSBs to which the first cell corresponds may be indicated by a sequence in the SSBs of the first cell.

For example, it is indicated by a DMRS sequence in the SSBs. When the first cell transmits the SSBs and two SSBs are QCLed, the two SSBs use identical DMRS sequences, and the two SSBs may be SSBs in the same window or different windows. In this way, the UE may determine the QCL relationships between the SSBs by detecting DMRSs in the SSBs. When DRMS sequences of two SSBs are identical, the two SSBs are deemed as being QCLed. The SSBs here are SSBs detected by the UE.

In this embodiment, when the UE receives the indication information corresponding to the first cell transmitted by the second cell and receives the indication information corresponding to the first cell transmitted by the first cell, the UE performs the SSB-based measurement according to the indication information transmitted by the first cell.

It can be seen from the above embodiment that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

Embodiment 2

The embodiment of this disclosure provides an SSB-based measurement method, applicable to a network device side. This method corresponds to the SSB-based measurement method applicable to a user equipment side described in Embodiment 1, with identical contents being not going to be described herein any further.

Figure 7:
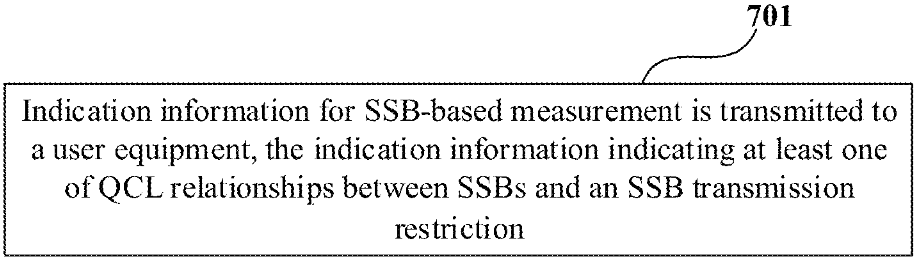
FIG. 7 is a schematic diagram of the SSB-based measurement method of Embodiment 2 of this disclosure.

FIG. 7 is a schematic diagram of the SSB-based measurement method of Embodiment 2 of this disclosure. As shown in FIG. 7, the method including:

Step 701: indication information for SSB-based measurement is transmitted to a user equipment, the indication information indicating at least one of QCL relationships between SSBs and an SSB transmission restriction.

In this embodiment, the indication information includes first indication information indicating the QCL relationships between SSBs and/or second indication information indicating the SSB transmission restriction, the first indication information including at least one of the number of beams and an SSB group;

and the second indication information including at least one of a specified number of SSBs transmitted in a window, a maximum number of SSBs transmitted in a window, a range of transmission of SSBs in a window, a specified number of SSBs corresponding to a beam and transmitted in a window, and a maximum number of SSBs corresponding to a beam and transmitted in a window.

In this embodiment, the QCL relationships between SSBs are, for example, QCL relationships between SSBs to which a first cell corresponds, and the SSB transmission restriction is, for example, an SSB transmission restriction to which the first cell corresponds.

In this embodiment, the network device may transmit the indication information via at least one of a physical broadcast channel (PBCH), MAC signaling, and system information.

In this case, the indication information may further be used for the user equipment to transceive other signals and/or channels in the first cell.

In this embodiment, the indication information may also be transmitted via RRC signaling. In this case, the indication information is MO-specific or cell-specific.

In this embodiment, a relationship between the network device transmitting the indication information and the first cell is not limited. For example, the network device is a serving base station or a non-serving base station of the first cell.

In this embodiment, reference may be made to what is described in Embodiment 1 for detailed contents of the QCL relationships between SSBs and the SSB transmission restriction, a particular method for transmitting the indication information by the network device and detailed contents of the indication information, which shall not be described herein any further.

It can be seen from the above embodiment that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

Embodiment 3

The embodiment of this disclosure provides an SSB-based measurement method, applicable to a user equipment side and a network device side. This method corresponds to embodiments 1 and 2, and reference may be made to what is described in embodiments 1 and 2 for particular implementations, with identical contents being not going to be described herein any further.

Figure 8:
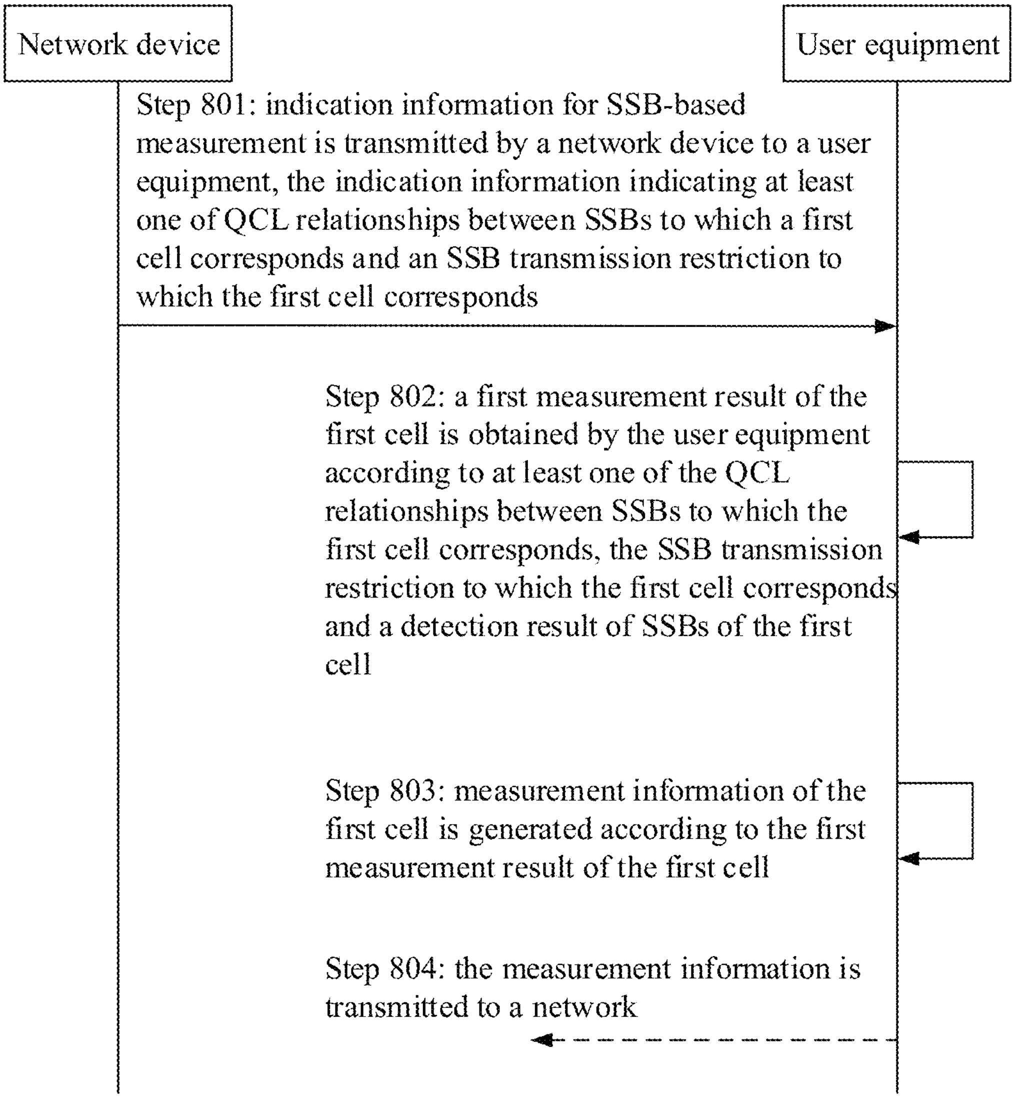
FIG. 8 is a schematic diagram of the SSB-based measurement method of Embodiment 3 of this disclosure.

FIG. 8 is a schematic diagram of the SSB-based measurement method of Embodiment 3 of this disclosure. As shown in FIG. 8, the method including:

Step 801: indication information for SSB-based measurement is transmitted by a network device to a user equipment, the indication information indicating at least one of QCL relationships between SSBs to which a first cell corresponds and an SSB transmission restriction to which the first cell corresponds;

Step 802: a first measurement result of the first cell is obtained by the user equipment according to at least one of the QCL relationships between SSBs to which the first cell corresponds, the SSB transmission restriction to which the first cell corresponds and a detection result of SSBs of the first cell;

Step 803: measurement information of the first cell is generated according to the first measurement result of the first cell; and Step 804: the measurement information is transmitted to a network.

In this embodiment, particular implementations of steps 801-804 are identical to those described in embodiments 1 and 2, which shall not be described herein any further.

In this embodiment, the network device transmitting the indication information to the UE may correspond to a network to which the UE reports the measurement information, or may not correspond to it, and a relationship between the network device and the network is not limited in this embodiment.

For example, as shown in FIG. 8, a target network to which the UE reports the measurement information is not necessarily a network corresponding to the network device, hence, it is shown by dotted lines.

It can be seen from the above embodiment that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

Embodiment 4

The embodiment of this disclosure provides an SSB-based measurement apparatus, configured at a user equipment side. As a principle of the apparatus is similar to that of the method of Embodiment 1, reference may be made to the implementation of the method of Embodiment 1 for implementation of the apparatus, with identical or similar contents being not going to be described herein any further.

Figure 9:
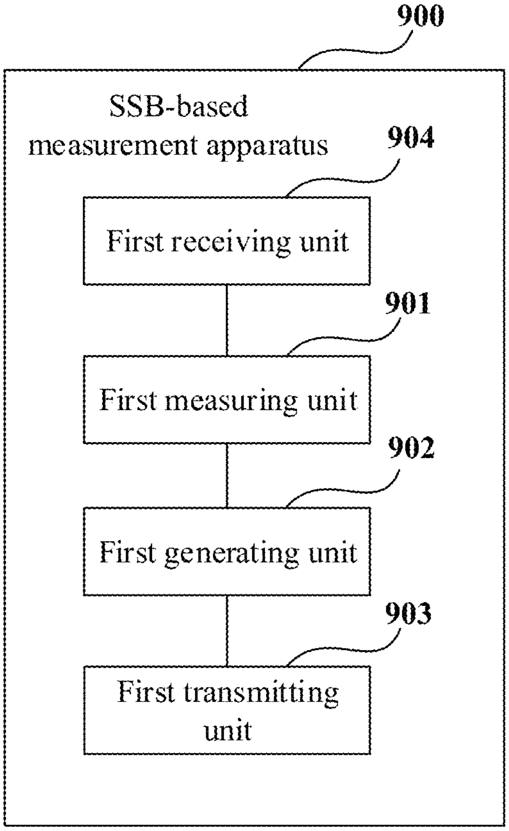
FIG. 9 is a schematic diagram of the SSB-based measurement apparatus of Embodiment 4 of this disclosure.

FIG. 9 is a schematic diagram of the SSB-based measurement apparatus of Embodiment 4 of this disclosure. As shown in FIG. 9, an apparatus 900 includes:

a first measuring unit 901 configured to obtain a first measurement result of a first cell according to at least one of QCL relationships between SSBs to which the first cell corresponds, an SSB transmission restriction to which the first cell corresponds and a detection result of SSBs of the first cell;

a first generating unit 902 configured to generate measurement information of the first cell according to the first measurement result of the first cell; and a first transmitting unit 903 configured to transmit the measurement information to a network.

In this embodiment, the apparatus 900 may further include:

a first receiving unit 904 configured to receive indication information, the indication information indicating at least one of the QCL relationships between the SSBs to which the first cell corresponds and the SSB transmission restriction to which the first cell corresponds.

In this embodiment, reference may be made to contents of related steps in Embodiment 1 for implementations of functions of the above units, which shall not be described herein any further.

It can be seen from the above embodiment that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

Embodiment 5

The embodiment of this disclosure provides an apparatus for transmitting indication information used for measurement, configured at a network device side. As a principle of the apparatus is similar to that of the method of Embodiment 2, reference may be made to the implementation of the method of Embodiment 2 for implementation of the apparatus, with identical or similar contents being not going to be described herein any further.

Figure 10:
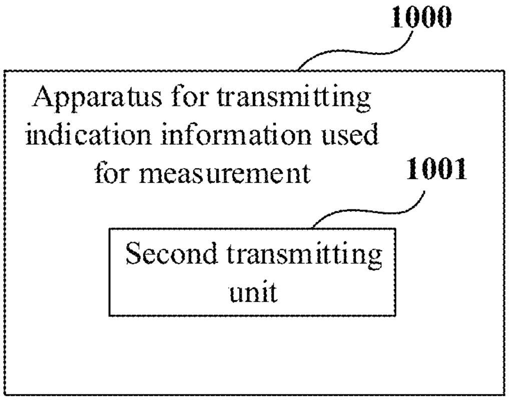
FIG. 10 is a schematic diagram of the apparatus for transmitting indication information used for measurement of Embodiment 5 of this disclosure.

FIG. 10 is a schematic diagram of the apparatus for transmitting indication information used for measurement of Embodiment 5 of this disclosure. As shown in FIG. 10, an apparatus 1000 includes:

a second transmitting unit 1001 configured to transmit indication information for SSB-based measurement, the indication information indicating at least one of QCL relationships between SSBs and an SSB transmission restriction.

In this embodiment, reference may be made to what is described in Embodiment 1 for a method for transmitting the indication information by the second transmitting unit 1001 and contents of the indication information, which shall not be described herein any further.

It can be seen from the above embodiment that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

Embodiment 6

The embodiment of this disclosure provides a user equipment, including the SSB-based measurement apparatus as described in Embodiment 4.

Figure 11:
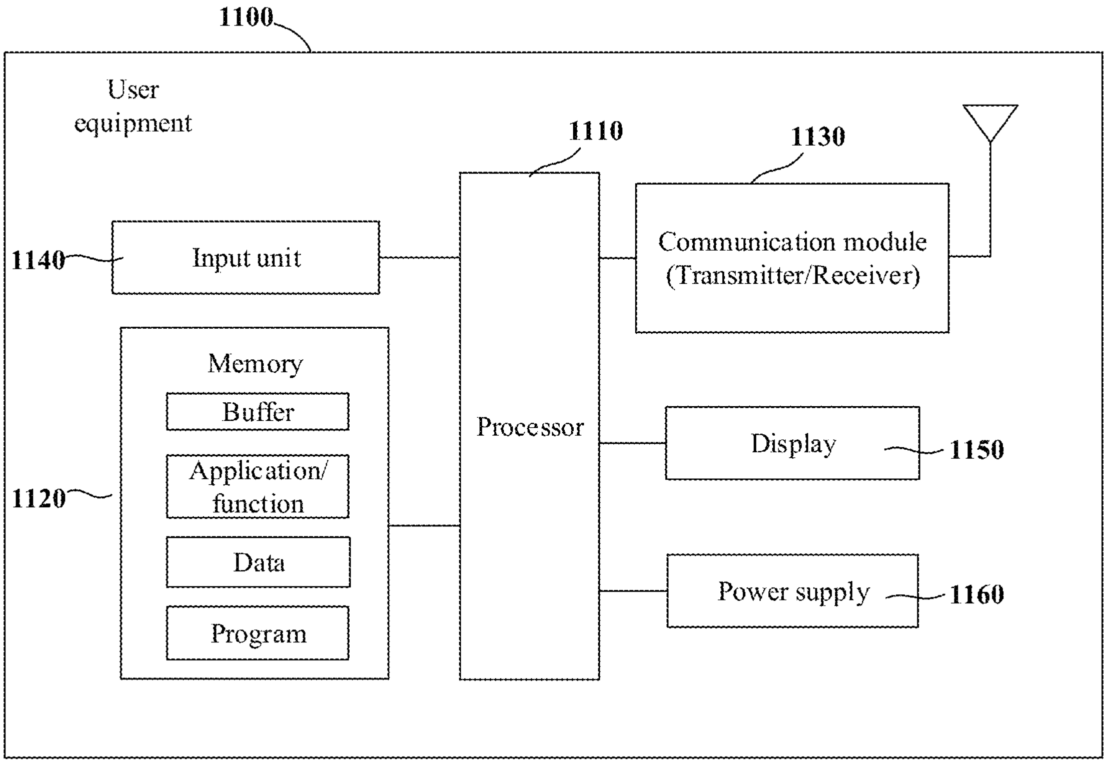
FIG. 11 is a block diagram of a systematic structure of the user equipment of Embodiment 6 of this disclosure.

FIG. 11 is a block diagram of a systematic structure of the user equipment of Embodiment 6 of this disclosure. As shown in FIG. 11, a user equipment 1100 may include a processor 1110 and a memory 1120, the memory 1120 being coupled to the processor 1110. It should be noted that this figure is illustrative only, and other types of structures may also be used, so as to supplement or replace this structure and achieve a telecommunications function or other functions.

In one implementation, the functions of the SSB-based measurement apparatus may be integrated into the processor 1110. In this embodiment, the processor 1110 may be configured to: obtain a first measurement result of a first cell according to at least one of QCL relationships between SSBs to which the first cell corresponds, an SSB transmission restriction to which the first cell corresponds and a detection result of SSBs of the first cell; generate measurement information of the first cell according to the first measurement result of the first cell; and transmit the measurement information to a network.

In another implementation, the SSB-based measurement apparatus and the processor 1110 may be configured separately; for example, the SSB-based measurement apparatus may be configured as a chip connected to the processor 1110, and the functions of the SSB-based measurement apparatus are executed under control of the processor 1110.

As shown in FIG. 11, the user equipment 1100 may further include a communication module 1130, an input unit 1140, a display 1150, and a power supply 1160, etc. It should be noted that the user equipment 1100 does not necessarily include all the parts shown in FIG. 11. Furthermore, the user equipment 1100 may include parts not shown in FIG. 11, and the relevant art may be referred to.

As shown in FIG. 11, the processor 1110 is sometimes referred to as a controller or an operational control, which may include a microprocessor or other processor devices and/or logic devices. The processor 1110 receives input and controls operations of components of the user equipment 1100.

In this embodiment, the memory 1120 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1110 may execute programs stored in the memory 1120, so as to realize information storage or processing, etc. Functions of other parts are similar to those of the relevant art, which shall not be described herein any further. The parts of the user equipment 1100 may be realized by specific hardware, firmware, software, or any combination thereof, without departing from the scope of this disclosure.

It can be seen from the above embodiment that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

Embodiment 7

The embodiment of this disclosure provides a network device, including the apparatus for transmitting indication information used for measurement as described in Embodiment 5.

Figure 12:
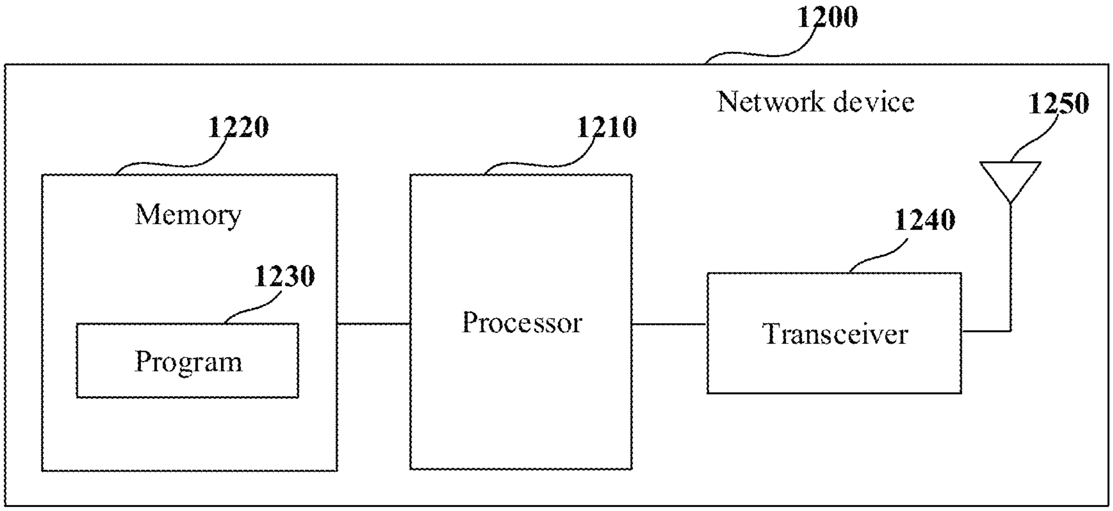
FIG. 12 is a schematic diagram of a structure of the network device of Embodiment 7 of this disclosure.

FIG. 12 is a schematic diagram of a structure of the network device of Embodiment 7 of this disclosure. As shown in FIG. 12, a network device 1200 may include a processor 1210 and a memory 1220, the memory 1220 being coupled to the processor 1210. In this embodiment, the memory 1220 may store various data, and furthermore, it may store a program 1230 for data processing, and execute the program 1230 under control of the processor 1210, so as to receive various data transmitted by a user equipment and transmit various data to the user equipment.

In one implementation, the functions of the apparatus for transmitting indication information used for measurement may be integrated into the processor 1210. In this embodiment, the processor 1210 may be configured to: transmit indication information for SSB-based measurement, the indication information indicating at least one of QCL relationships between SSBs and an SSB transmission restriction.

In another implementation, the apparatus for transmitting indication information used for measurement and the processor 1210 may be configured separately; for example, the apparatus for transmitting indication information used for measurement may be configured as a chip connected to the processor 1210, and the functions of the apparatus for transmitting indication information used for measurement are executed under control of the processor 1210.

Furthermore, as shown in FIG. 12, the network device 1200 may include a transceiver 1240, and an antenna 1250, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

It can be seen from the above embodiment that by obtaining a first measurement result of a first cell according to at least one of QCL relationships between SSBs to which the first cell corresponds, an SSB transmission restriction to which the first cell corresponds and a detection result of SSBs of the first cell, and generating and reporting measurement information of the first cell according to the first measurement result of the first cell, accuracy of SSB-based measurement reporting may be effectively improved and complexity and power consumption of the SSB-based measurement may be lowered.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 9 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 9 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 21 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

According to various implementations disclosed in the embodiments of this disclosure, following supplements are further disclosed.

1. An SSB-based measurement apparatus, applicable to a user equipment side, the apparatus including:
   a first measuring unit configured to obtain a first measurement result of a first cell according to at least one of QCL relationships between SSBs to which the first cell corresponds, an SSB transmission restriction to which the first cell corresponds and a detection result of SSBs of the first cell;
   a first generating unit configured to generate measurement information of the first cell according to the first measurement result of the first cell; and
   a first transmitting unit configured to transmit the measurement information to a network.
2. The apparatus according to supplement 1, wherein the first measuring unit includes:
   a second measuring unit configured to obtain a second measurement result of the first cell according to at least one of the QCL relationships between SSBs to which the first cell corresponds, the SSB transmission restriction to which the first cell corresponds and the detection result of SSBs of the first cell, the second measurement result being of a beam level or an SSB time domain position level; and
   a second generating unit configured to obtain the first measurement result according to at least one of the second measurement results.
3. The apparatus according to supplement 2, wherein the second measurement results are of a beam level,
   and the second measuring unit includes:
   a first selecting unit configured to select an SSB from multiple SSBs corresponding to a first beam and located at different candidate SSB time domain positions in a window; and
   a third generating unit configured to obtain the second measurement result corresponding to the first beam according to the selected SSB.
4. The apparatus according to supplement 2, wherein the second measurement results are of an SSB time domain position level,
   and the second measuring unit includes:
   a second selecting unit configured to select an SSB from multiple SSBs corresponding to a first SSB time domain position in different windows; and
   a fourth generating unit configured to obtain the second measurement result corresponding to the first SSB time domain position according to the selected SSB.
5. The apparatus according to supplement 1, wherein the SSB transmission restriction includes at least one of the following:
   a specified number of SSBs transmitted in a window, a maximum number of SSBs transmitted in a window, a range of transmission of SSBs in a window, a specified number of SSBs corresponding to a beam and transmitted in a window, and a maximum number of SSBs corresponding to a beam and transmitted in a window.
6. The apparatus according to supplement 2, wherein,
   the second measurement result is of an SSB time domain position level, and includes multiple second measurement results corresponding to different SSB time domain positions, and the second generating unit selects one of the multiple second measurement results or combines the multiple second measurement results according to the QCL relationships between the SSBs to which the first cell corresponds, and obtains the first measurement result according to the selected second measurement result or a result of combination.
7. The apparatus according to supplement 6, wherein,
   different SSB time domain positions corresponding to the second measurement results correspond to the same beam.
8. The apparatus according to supplement 1, wherein the first generating unit includes:
   a fifth generating unit configured to generate the measurement information of the beam level of the first cell according to the first measurement result; wherein the first measurement result of the first cell is of a beam level; or
   a sixth generating unit configured to generate the measurement information of the beam level of the first cell according to the first measurement result and the QCL relationships between the SSBs to which the first cell corresponds; wherein the first measurement result of the first cell is of an SSB time domain position level, the measurement information includes SSB time domain position indices, and beams to which two SSB time domain position indices included in the measurement information are different.
9. The apparatus according to supplement 8, wherein,
   for multiple first measurement results to which multiple SSB time domain positions corresponding to a beam correspond, the sixth generating unit selects one of the first measurement results or combines the multiple first measurement results, and generates the measurement information of the first cell corresponding to the beam according to the selected first measurement result or a result of combination.
10. The apparatus according to supplement 1, wherein,
   at least one of the QCL relationships between the SSBs to which the first cell corresponds and the SSB transmission restriction to which the first cell corresponds is predefined or is indicated by the network.
11. The apparatus according to supplement 1 or 10, wherein the apparatus further includes:
   a first receiving unit configured to receive indication information, the indication information indicating at least one of the QCL relationships between the SSBs to which the first cell corresponds and the SSB transmission restriction to which the first cell corresponds.
12. The apparatus according to supplement 11, wherein,
   the indication information includes at least one of the number of beams and an SSB grouping of the first cell, to indicate the QCL relationships between the SSBs to which the first cell corresponds.
13. The apparatus according to supplement 11, wherein the indication information is transmitted via at least one of a physical broadcast channel (PBCH), MAC signaling, and system information.

14. The apparatus according to supplement 13, wherein the indication information is further used by a user equipment in transceiving other signals and/or channels in the first cell.

15. The apparatus according to supplement 13 or 14, wherein the indication information is transmitted by the first cell.

16. The apparatus according to supplement 15, wherein the indication information is used only for measurement of the first cell, or the indication information is further used for SSB-based measurement of a second cell, frequency domain positions and SCSs of SSBs of the second cell and SSBs of the first cell are identical.

17. The apparatus according to supplement 11, wherein the indication information is transmitted via RRC signaling.

18. The apparatus according to supplement 17, wherein the indication information is MO-specific or cell-specific.

19. The apparatus according to supplement 1 or 10, wherein the QCL relationships between the SSBs to which the first cell corresponds is indicated by a sequence in the SSBs of the first cell.

20. An apparatus for transmitting indication information used for measurement, applicable to a network device side, the apparatus including:

a second transmitting unit configured to transmit indication information for SSB-based measurement to a user equipment, the indication information indicating at least one of QCL relationships between SSBs and an SSB transmission restriction.

21. The apparatus according to supplement 20, wherein, the network device transmits the indication information via at least one of a physical broadcast channel (PBCH), MAC signaling, and system information.

22. The apparatus according to supplement 21, wherein the indication information is further used for the UE to transceive other signals and/or channels in the first cell.

23. The apparatus according to supplement 20, wherein the indication information is transmitted via RRC signaling.

24. The apparatus according to supplement 23, wherein the indication information is MO-specific or cell-specific.

25. The apparatus according to supplement 20, wherein, the indication information includes first indication information indicating the QCL relationships between the SSBs and/or second indication information indicating the SSB transmission restriction, the first indication information including at least one of the number of beams and an SSB grouping;

and the second indication information including at least one of a specified number of SSBs transmitted in a window, a maximum number of SSBs transmitted in a window, a range of transmission of SSBs in a window, a specified number of SSBs corresponding to a beam and transmitted in a window, and a maximum number of SSBs corresponding to a beam and transmitted in a window.

26. A user equipment, including the apparatus as described in any one of supplements 1-19.

27. A network device, including the apparatus as described in any one of supplements 20-25.

28. A communication system, including the user equipment as described in supplement 26 and/or the network device as described in supplement 27.

What is claimed is:

1. An SSB-based measurement apparatus, applicable to a user equipment side, the apparatus comprising:

first receiving circuitry configured to receive a measurement object (MO) configuration, wherein the MO configuration includes indication information that includes:

MO-specific indication information indicating quasi co-location (QCL) relationships between synchronization signal blocks (SSBs), the MO-specific indication information being applicable for a cell that lacks applicable cell-specific indication information, and/or cell-specific indication information indicating quasi co-location (QCL) relationships between synchronization signal blocks (SSBs), the cell-specific indication information being associated with a cell identifier of a cell for which the cell-specific indication information is applicable;

first measuring circuitry configured to obtain a first measurement result of a first cell according to the QCL relationships between the SSBs indicated by the MO-specific indication information in case that the first cell lacks applicable cell-specific indication information or by cell-specific indication information that is applicable for the first cell;

first generating circuitry configured to generate measurement information of the first cell according to the first measurement result of the first cell; and first transmitting circuitry configured to transmit the measurement information to a network.

2. The apparatus according to claim 1, wherein the first measuring circuitry comprises:

second measuring circuitry configured to obtain at least one second measurement result of the first cell according to the QCL relationships between SSBs to which the first cell corresponds, the second measurement result being of a beam level or an SSB time domain position level; and second generating circuitry configured to generate the first measurement result according to at least one second measurement result of the at least one second measurement result.

3. The apparatus according to claim 2, wherein the second measurement result is of a beam level, and the second measuring circuitry comprises:

first selecting circuitry configured to select an SSB from multiple SSBs corresponding to a first beam and located at different candidate SSB time domain positions in a window; and third generating circuitry configured to obtain the second measurement result corresponding to the first beam according to the selected SSB.

4. The apparatus according to claim 2, wherein the second measurement result is of an SSB time domain position level, and the second measuring circuitry comprises:

second selecting circuitry configured to select an SSB from multiple SSBs corresponding to a first SSB time domain position in different windows; and fourth generating circuitry configured to obtain the second measurement result corresponding to the first SSB time domain position according to the selected SSB.

5. The apparatus according to claim 2, wherein, the second measurement result is of an SSB time domain position level, and comprises multiple second measurement results corresponding to different SSB time domain positions, and the second generating circuitry selects one of the multiple second measurement results or combines the multiple second measurement results according to the QCL relationships between the SSBs to which the first cell corresponds, and obtains the first measurement result according to the selected second measurement result or a result of combination.

6. The apparatus according to claim 5, wherein, different SSB time domain positions corresponding to the second measurement results correspond to the same beam.

7. The apparatus according to claim 1, wherein the first generating circuitry comprises:

second generating circuitry configured to generate the measurement information of the beam level of the first cell according to the first measurement result; wherein the first measurement result of the first cell is of a beam level; or third generating circuitry configured to generate the measurement information of the beam level of the first cell according to the first measurement result and the QCL relationships between the SSBs to which the first cell corresponds; wherein the first measurement result of the first cell is of an SSB time domain position level, the measurement information comprises SSB time domain position indices, and beams to which two SSB time domain position indices comprised in the measurement information are different.

8. The apparatus according to claim 7, wherein, for multiple first measurement results to which multiple SSB time domain positions corresponding to a beam correspond, the third generating circuitry selects one of the first measurement results or combines the multiple first measurement results, and generates the measurement information of the first cell corresponding to the beam according to the selected first measurement result or a result of combination.

9. The apparatus according to claim 1, wherein, the indication information includes at least one of the number of beams and an SSB grouping of the first cell, to indicate the QCL relationships between the SSBs to which the first cell corresponds.

10. The apparatus according to claim 1, wherein the indication information is transmitted via at least one of a physical broadcast channel (PBCH), MAC signaling, and system information.

11. The apparatus according to claim 10, wherein the indication information is further used by a user equipment in transceiving other signals and/or channels in the first cell.

12. The apparatus according to claim 10, wherein the indication information is transmitted by the first cell.

13. The apparatus according to claim 12, wherein the indication information is used only for measurement of the first cell, or the indication information is further used for SSB-based measurement of a second cell, frequency domain positions and SCSs of SSBs of the second cell and SSBs of the first cell are identical.

14. An apparatus, applicable to a network device side, the apparatus comprising:

second transmitting circuitry configured to transmit a measurement object (MO) configuration for SSB-based measurement to a user equipment, wherein the MO configuration includes indication information that includes:

MO-specific indication information indicating quasi co-location (QCL) relationships between synchronization signal blocks (SSBs), the MO-specific indication information being applicable for a cell that lacks applicable cell-specific indication information, and/or cell-specific indication information indicating quasi co-location (QCL) relationships between synchronization signal blocks (SSBs), the cell-specific indication information being associated with a cell identifier of a cell for which the cell-specific indication information is applicable.

15. The apparatus according to claim 14, wherein the indication information is transmitted via dedicated RRC signaling.

16. The apparatus according to claim 14, wherein, the indication information comprises first indication information indicating the QCL relationships between the SSBs, the first indication information comprising at least one of the number of beams and an SSB grouping.

17. The apparatus according to claim 14, wherein the indication information indicates a QCL relationship between SSBs via indicating number of beams or number of non-QCLed SSBs.

* * * * *